(12) United States Patent
Moore et al.

(10) Patent No.: US 8,207,490 B2
(45) Date of Patent: Jun. 26, 2012

(54) DYNAMIC RADIOACTIVE PARTICLE SOURCE

(75) Inventors: Murray E Moore, Los Alamos, NM (US); Adam Benjamin Gauss, Los Alamos, NM (US); Alan Lawrence Justus, Los Alamos, NM (US)

(73) Assignee: Los Alamos National Security, LLC, Lol Alamos, NM (US)

( * ) Notice: Subject to any disclaimer, the term of this patent is extended or adjusted under 35 U.S.C. 154(b) by 545 days.

(21) Appl. No.: 12/433,503

(22) Filed: Apr. 30, 2009

(65) Prior Publication Data

US 2010/0276579 A1    Nov. 4, 2010

(51) Int. Cl.
*G01D 18/00* (2006.01)
(52) U.S. Cl. .................................................. 250/252.1
(58) Field of Classification Search ............... 250/252.1, 250/370.02, 374, 380, 381
See application file for complete search history.

(56) References Cited

U.S. PATENT DOCUMENTS

| | | | | |
|---|---|---|---|---|
| 4,972,081 A | * | 11/1990 | Dumbeck, Sr. ............. | 250/253 |
| 5,552,610 A | * | 9/1996 | McIsaac et al. ............ | 250/435 |
| 5,977,547 A | * | 11/1999 | Phillips et al. ............. | 250/393 |
| 6,023,981 A | * | 2/2000 | Phillips et al. ............. | 73/863.23 |
| 2007/0163716 A1 | * | 7/2007 | Hsiao et al. .............. | 156/345.26 |

OTHER PUBLICATIONS

McFarland et al., "A CAM Sampler for Collecting and Assessing α-Emitting Aerosol Particles," Health Physics, vol. 61, No. 1 (Jul. 1991) pp. 97-103.
Hopke et al., "Radon and Radon Progeny Measurements," Trends in Analytical Chemistry, vol. 10, No. 8 (Sep. 1991) pp. 243-249.
McFarland et al., "A Continuous Sampler with Background Suppression for Monitoring Alpha-Emitting Aerosol Particles," Health Physics, vol. 62, No. 5 (Jan. 1992) pp. 400-406.

* cited by examiner

*Primary Examiner* — David Porta
*Assistant Examiner* — Marcus Taningco
(74) *Attorney, Agent, or Firm* — Meredith H. Schoenfeld

(57) ABSTRACT

A method and apparatus for providing a timed, synchronized dynamic alpha or beta particle source for testing the response of continuous air monitors (CAMs) for airborne alpha or beta emitters is provided. The method includes providing a radioactive source; placing the radioactive source inside the detection volume of a CAM; and introducing an alpha or beta-emitting isotope while the CAM is in a normal functioning mode.

13 Claims, 10 Drawing Sheets

(1) CAM filter
(2) Radioactive source
(3) Source mask
(4) rotary motor
(5) rotating mask
(6) aperture

DYNAMIC RADIOACTIVE PARTICLE SOURCE

STATEMENT REGARDING FEDERAL RIGHTS

This invention was made with government support under Contract No. DE-AC52-6NA25396, awarded by the U.S. Department of Energy. The government has certain rights in the invention.

BACKGROUND OF INVENTION

The present invention relates to a reliable, efficient and economical method and apparatus for the calibration and testing of continuous air monitors (CAMs). More particularly, the invention relates to a dynamic radioactive particle source (DRPS) which is designed to introduce actual radioactivity during real-time testing of a CAM, with a realistic spectra of alpha or beta radiation.

Alarming CAMs are a critical component for worker protection in facilities that handle large amounts of hazardous materials. In nuclear facilities, a CAM sampler alarms when levels of airborne radioactive materials exceed alarm thresholds, thus prompting workers to exit the room to reduce inhalation exposures. To maintain a high level of worker protection, CAMs are required to detect clouds of radioactive aerosols quickly and with good sensitivity.

The monitoring of airborne radioactive contamination is a critical aspect of the control and/or processing of many materials. One of the areas of technology where monitoring the presence of airborne radioactive contamination is of great concern involves the physical handling and disposing of materials classified as radioactive waste. Other areas of concern relate to weapons manufacturing and the processes involving nuclear fission, as the byproducts of these respective activities can be quite hazardous. The safety of workers in these areas and of the public in general is dependent on the ability to quickly detect even trace amounts of hazardous radioactive material released into the environment. When safe levels are exceeded, it is desirable to automatically trigger an alarm so as to warn personnel in the vicinity of the radioactive emission, for in some cases automatic or manual emergency procedures must be implemented to combat the emission.

The accurate triggering of an alarm is critical to safety. CAMs must have adequate sensitivity to alert potentially exposed individuals that their immediate action is necessary. Only two known methods exist for testing and calibrating CAM radiation response functionality. One can use a plated source, which yields a steady-state activity level of simulated collected aerosol. In contrast, the present invention provides a time-varying amount of radiation for testing purposes. Another drawback of the steady state method is the necessity of opening the filter compartment of the CAM in the middle of active air sampling and testing. In some CAMs, this may be a fatal interruption to obtaining a measurement.

Additionally one can test the CAM at an radioactive aerosol test facility, of which there are very few in the world at this time: examples include the Lovelace Respiratory Research Institute in Albuquerque and the EPICEA laboratory (Laboratoire d'Essais Physiques des Instruments de Mesure de la Contamination de l'Eau et de l'Air) in France. The Lovelace Respiratory Research Institute facility includes a station for instrument receipt and inspection, a test bench for determining detection efficiency and energy response for radioisotopes using point-type and area-type electroplated sources and ambient radon progeny; an inline aerosol delivery for testing the internal collection efficiency of sampling heads with fluorescent and other inert aerosols; an aerosol wind tunnel in which inert aerosols can be used to evaluate the inlet and transport efficiency of sampling probes and aerosol collection devices; an epi-fluorescent microscope with automated image analysis and computer-controlled positioning to determine the uniformity of particle deposition on collection filters; and systems for testing the normal response of monitors to ambient radon progeny aerosols or providing aerosols of plutonium or uranium (with or without radon progeny aerosols and interfering dusts) to air monitors under different conditions of concentration and time. The Lovelace air monitor test facility is similar, but not identical, to the EPICEA laboratory. The evaluation of CAMs in the presence of a plutonium aerosol is time intensive, expensive, and requires a specialized facility. Therefore, the present invention provides a DRPS which has numerous advantages to the current methods of CAM evaluation.

Amongst the advantages of the present invention are that it is adaptable for use in a number of different CAMs, it provides non-specialized in-house testing, it has a cost which is approximately 5 times less than the cost of a single test with plutonium test aerosol (for example), it allows for control of CAMs for multiple test scenarios, it is easily repeatable and reusable, it simulates a realistic radioactive aerosol spectrum and it supports iterative development and evaluation of CAMs. By its very nature, the DRPS system also does not foul a tested CAM sampler with radioactive contamination. Additionally, because the present invention does not require difficult and hazardous radioactive aerosol testing, CAM sampler performance could be determined with tests performed on a lab benchtop with no required safety equipment. (In this document, plutonium test aerosol is used as a comparison basis for the use of test aerosol that could be composed of differing radioactive isotopes.)

SUMMARY OF INVENTION

In accordance with the purposes of the present invention, as embodied and broadly described herein, the present invention includes an apparatus and corresponding method which is capable of being placed inside of the detection volume of a typical CAM, and more particularly, directly on top of the CAM filter to evaluate the CAM by providing a timed, synchronized DRPS. The method comprises providing an alpha or beta particle source; placing the radioactive source inside the detection volume of a CAM; and introducing an alpha or beta-emitting isotope while the CAM is in a normal functioning mode. The apparatus comprises a rotary motor, a source, and masks for the rotary motor and the source.

These and other aspects, advantages, and salient features of the present invention will become apparent from the following detailed description, the accompanying drawings, and the appended claims. It is to be understood that both the foregoing general description and the following detailed description are exemplary only, and are not restrictive of the invention, as claimed.

BRIEF DESCRIPTION OF THE DRAWINGS

The accompanying drawings, which are incorporated in and constitute a part of this specification, illustrate various embodiments. In the drawings.

DETAILED DESCRIPTION

Figure 1:
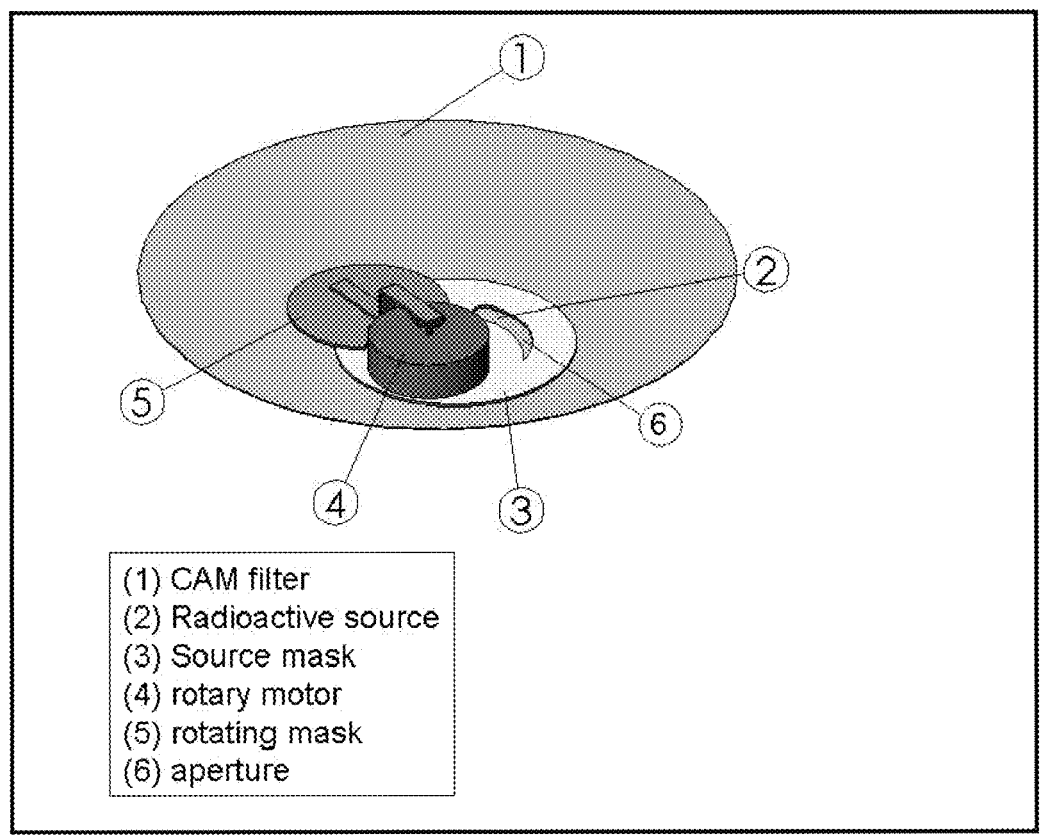
FIG. 1 is an isometric view of a first embodiment of the present invention.

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as either comprising or consisting of at least one of a group of elements and combinations thereof, it is understood that the group may comprise or consist of any number of those elements recited, either individually or in combination with each other.

Referring to the drawings in general, it will be understood that the illustrations are for the purpose of describing a particular embodiment of the invention and are not intended to limit the invention thereto.

Figure 2:
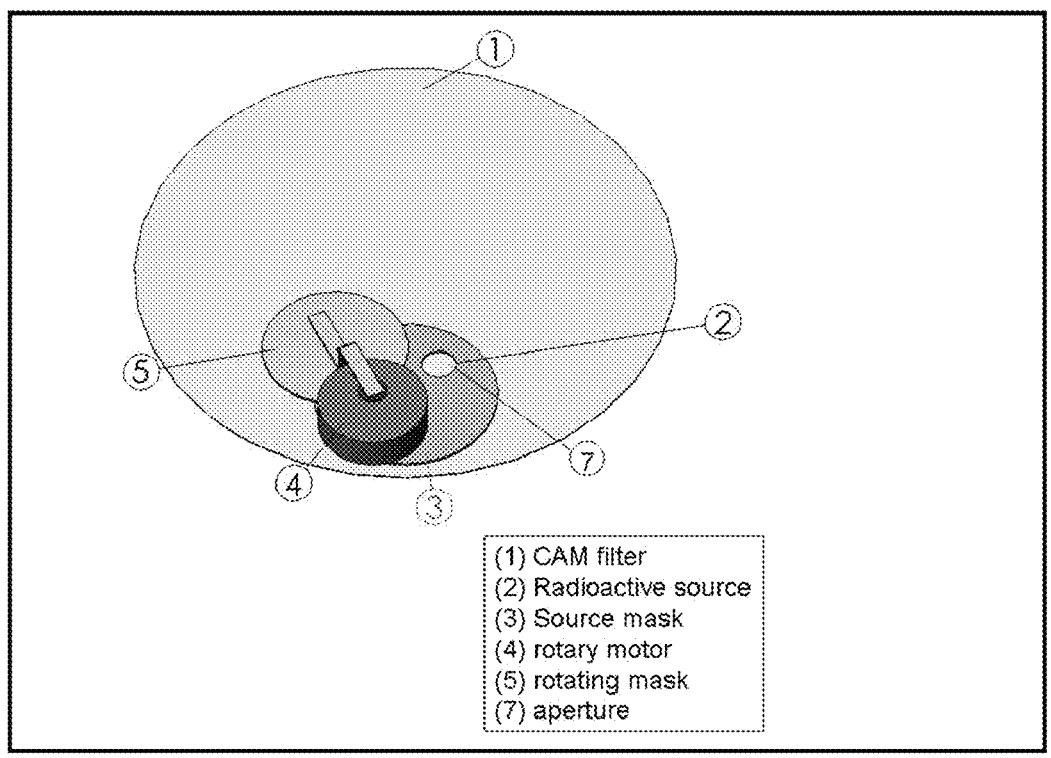
FIG. 2 is an isometric view of a second embodiment of the present invention.

In FIGS. 1 and 2, there can be seen of two embodiments of the present invention where 1 is a filter, the kind which are used in a typical CAM, such as the Thermo-Fisher Alpha-7, the Bladewerx Alpha CAMs, and the Canberra Alpha Sentry. Filter 1 is ordinarily a flat, disk-shaped membrane filter. Typically, such a filter is approximately 25 mm to 47 mm in diameter. In many samplers, the filter 1 is placed below a detector (e.g. in a CAM for alpha activity, a solid-state silicon surface barrier detector is often used). Typically, there is a vertical spacing of between 4 mm and 8 mm between the circular filter and the circular detector. Therefore, if the present invention is to be used with a typical filter, it will be approximately 12 mm wide and approximately 3 mm in height.

The base of the present invention is provided by a rotary motor 4. Rotary motor 4 can be any known motor that is capable of rotation. One example of a rotary motor that may be used is a stepping motor such as the kind used with an analog wristwatch. In the present invention motor 4 is approximately 10 mm in diameter, although it can be any size as long as it is proportionate with respect to filter 1.

Fastened on top of rotary motor 4 is mask 5. A source of an alpha or beta radiation emitting isotope 2 is placed underneath a source mask 3. For alpha radiation applications, the source 2 may be plutonium, americium (particularly plutonium-239 and americium-241) or any other appropriate source. The source may have any appropriate configuration. As an example, if an analog watch movement mechanism is used for rotary motor 4, the movement may be purchased in its stock format, before it is installed into a wristwatch case. The source mask 3 prevents the alpha or beta radiation particles from reaching the collector and collected and counted.

Mask 5 is fastened to the motor spindle and is designed to cover and then reveal an aperture 6 in the mask 3. In FIGS. 1 and 2, apertures 6 and 7 are shaped such that progressively larger amounts of source 2 are exposed over time, therefore mimicking the dynamic air concentration of radioactive material in a sampling environment. Apertures 6 and 7 may be shaped however is necessary to mimic the appropriate conditions. For example, FIGS. 1 and 2 shows apertures 6 and 7 shaped as a teardrop and as a circle, respectively. As the rotating mask 5 progressively uncovers the teardrop shaped aperture 6, the detector sees an abrupt introduction of radioactivity into its sensing volume, which tapers off over time, therefore simulating a long chronic release of radioactive contamination into the air of an enclosed room (see FIGS. 6 and 7). In FIG. 2, the circular shape aperture 7 simulates an acute "puff" release into the air and a subsequent deposition of radioactive contamination onto the sampling filter.

Figure 3:
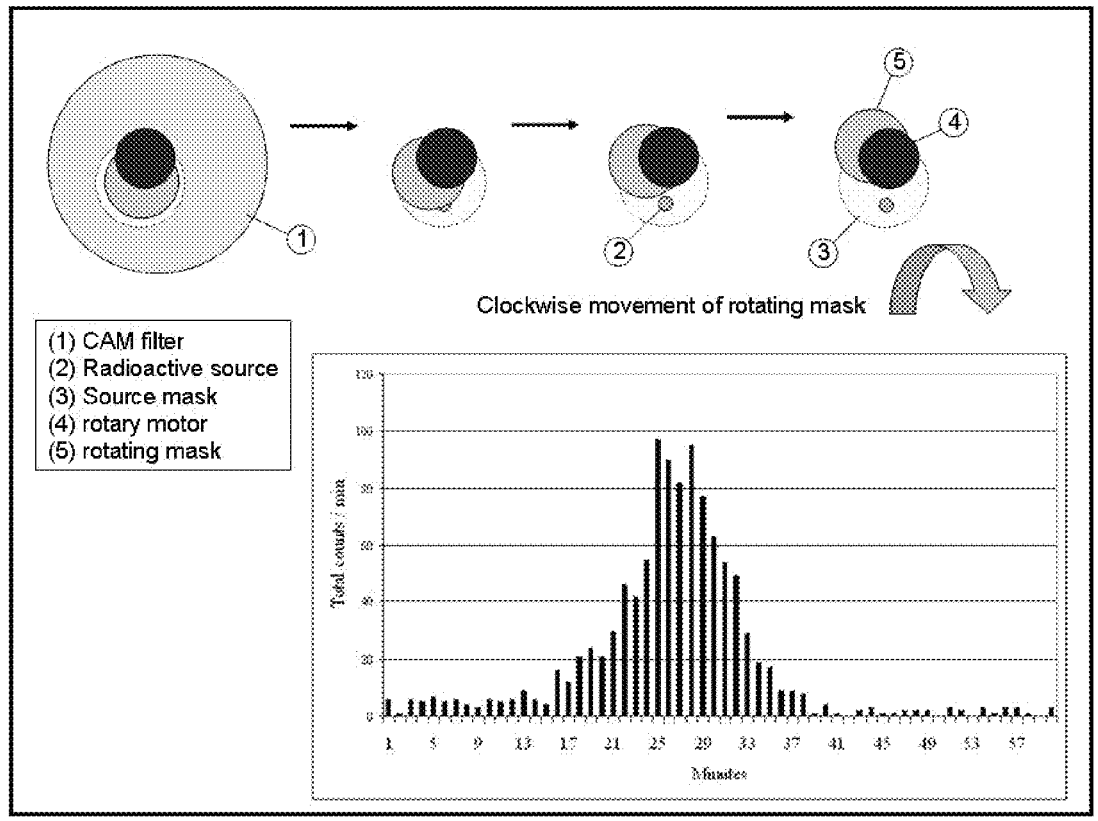
FIG. 3 is shows the progression of the present invention over time.

FIG. 3 shows how the DRPS works as time progresses. In practice the device would be placed on top of the CAM sampling filter. The rotary motor 4 causes the mask 5 to rotate. As the mask 5 rotates, its position relative to source 2 changes. As shown in FIG. 3., as time progresses apertures 6 and 7 will either be fully aligned, partially aligned, or not aligned at all. When apertures 6 and 7 are either fully aligned or partially aligned, the DRPS will introduce the presence of an alpha or beta-radiation emitting isotope to the CAM detector. Based on the shape and alignment of apertures 6 and 7, differing radiation profiles may be created. The DRPS introduces radiation into the CAM sensing volume while the CAM is in a normal functioning mode. That is, the CAM will be actively sampling air and pulling air through the sample filter while the DRPS is functioning. As explained above, a major advantage of the present invention is that it does not require any interruption of the CAM when it is in normal functioning mode.

Figure 4:
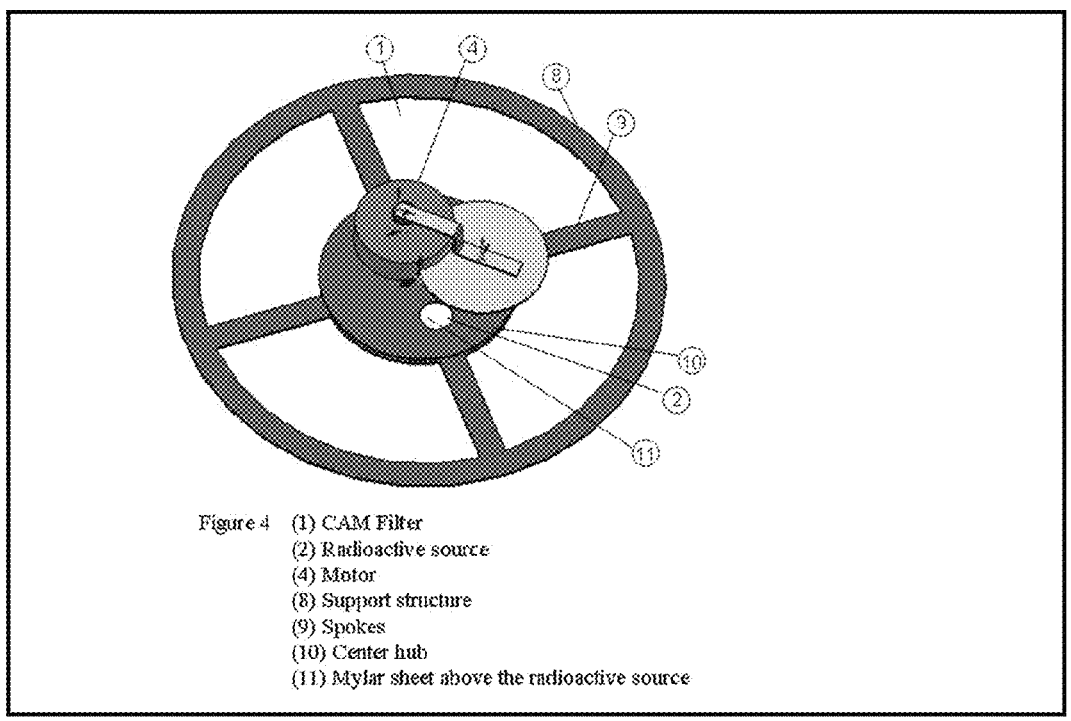
FIG. 4 is an isometric view of a support structure which may be used with the present invention.
Figure 5:
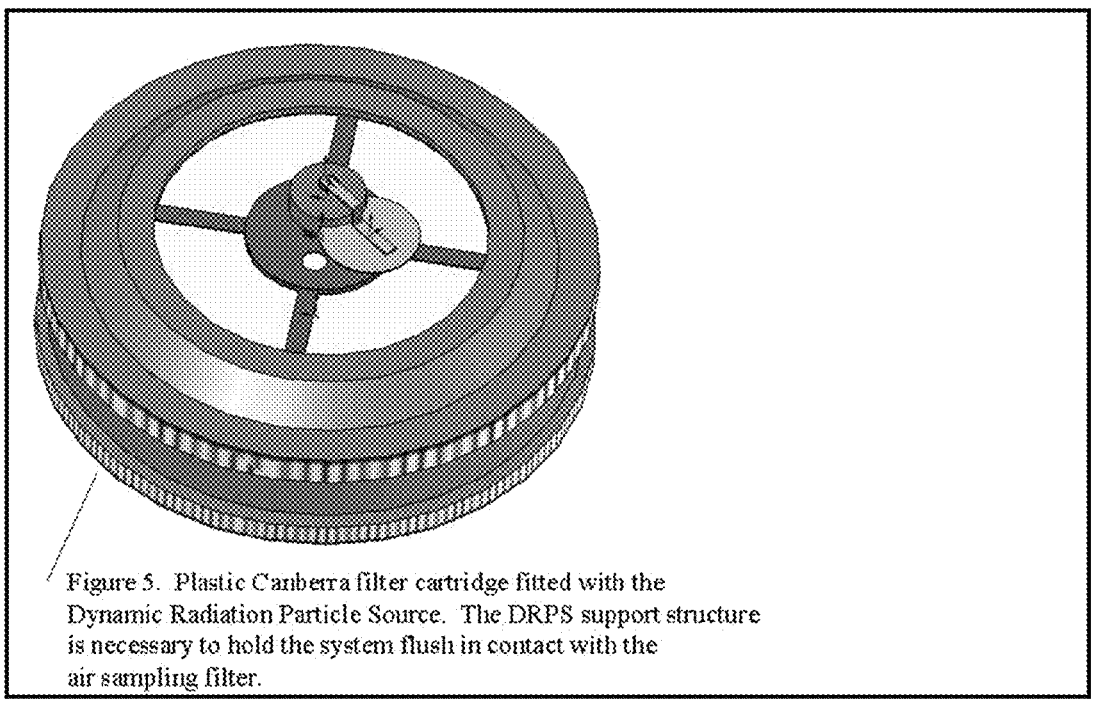
FIG. 5 is an isometric view of a support structure which may be used with the present invention, mounted into a typical commercial filter cartridge.

FIG. 4 and FIG. 5 show an isometric view of a support structure 8 which may be used to hold the rotary motor 4 flush to the sampling filter at different orientations (i.e. horizontal, vertical, etc.) The support structure 8 is shaped similarly to a wagon wheel, and has a number of spokes 9 and a center hub 10, to which the rotary motor is attached. Air then flows through the filter between the spokes 9. FIG. 5 shows the current invention fitted into a (commercially available) Canberra Corp. filter cartridge. The cartridge has a top cap that snap-fits to secure the filter material to the filter cartridge base, and the invented support structure fits under the lip of the plastic filter cartridge top cap.

For situations restricted to those involving alpha radiation, the radioactive source is a commercially available flat metal disk electroplated with a radioactive alpha-emitting isotope. In FIG. 4, this source is covered by an optional mylar sheet 11. The mylar sheet will alter the emitted alpha energy spectrum such that it would be essentially identical to the spectrum that is seen from a collection of alpha-emitting aerosol particles that have been deposited onto a sampling filter. Different mylar thicknesses would mimic differing populations of aerosols. In the instance of actual deposited aerosols, the size, shape and number of particles will absorb and degrade the emitted aerosol alpha energies, and the 11 mylar sheet will be used to mimic this effect.

Figure 6:
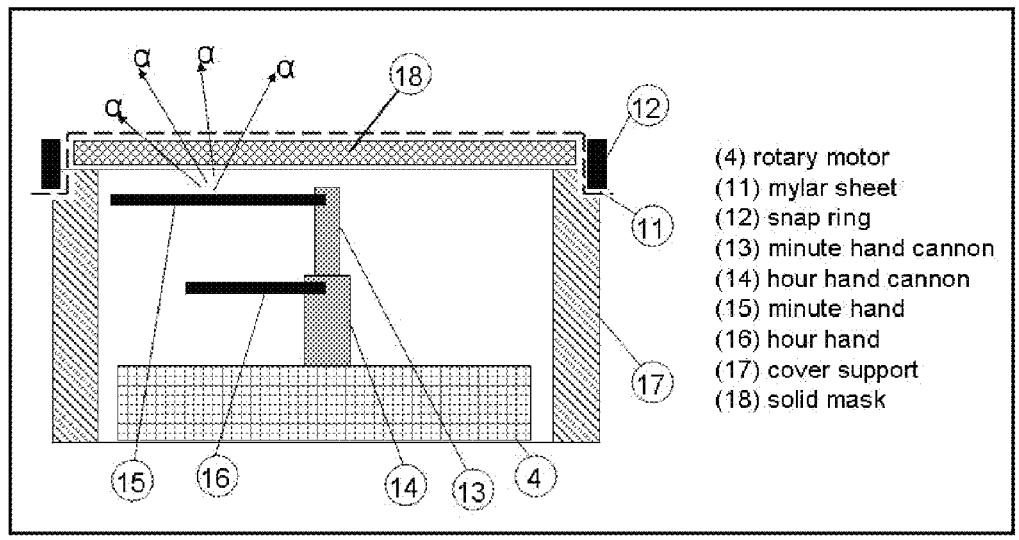
FIG. 6 is a schematic of an embodiment of the present invention, as depicted from the side.

FIG. 6 shows a side-view schematic of the present invention where the source is provided by an electroplated watch hand. FIG. 6 also shows an optional mylar sheet 11 which serves two functions. First, the mylar sheet 11 will prevent conventional room air dust from entering and fouling rotary motor 4 during testing. Second, it will condition the alpha energy spectrum so that the detected spectrum would be essentially identical to the spectrum produced by alpha-emitting aerosol particles. The size and shape of actual aerosol particles will absorb and degrade the emitted alpha energy, and the mylar sheet 11 mimics this effect.

Mylar sheet 11 may be attached in any manner. For example, as shown in FIG. 6, mylar sheet 11 is attached via a snap ring 12 for a drum-head type cover. Mylar sheet 11 also has a cover support 17 which surrounds it on either side.

FIG. 6 shows the use of a wristwatch to create the DRPS. The minute hand cannon (a.k.a. spindle) 13 and hour hand cannon 14 are retained from the watch mechanism. Either the minute hand 15 or the hour hand 16 may be coated with radioactive material. Depending on whether or not a long-running or a short-running system is desired, the appropriate watch hand will be used. For example if a short-running system is desired, the hour hand may be removed and an electroplated minute hand will be used. A mask 18 covers the watch hands. The mask 18 may be placed either above or below mylar sheet 11. It would be shaped to have an aperture so that progressively larger amounts of the watch hand would be exposed, therefore mimicking the steady concentration of radioactive material in a sampling environment.

As an alternative to the electroplated watch hand, a disk-shaped electroplated source may be laid directly on top of the watch mechanism housing. A disk could be fashioned to fit on the cannon (a.k.a. spindle) of the wristwatch. The disk would be able to rotate and a hole in the disk could be used to introduce increasing amounts of activity for CAM testing.

Figure 6A:
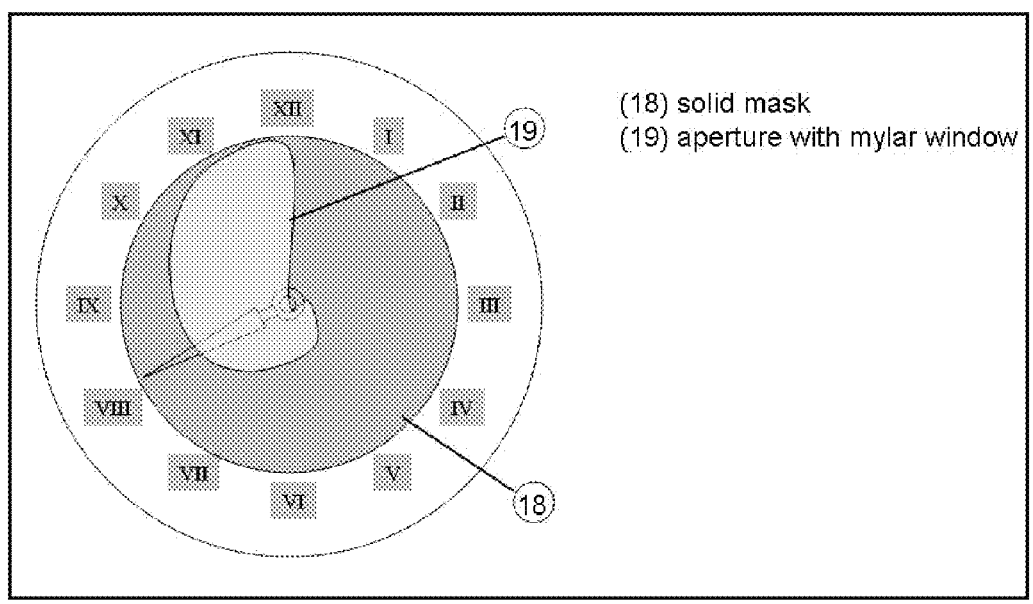
FIG. 6A shows an example of the present invention using a wristwatch.

In the example shown in FIG. 6A, with the aperture geometry 19 as shown, alpha radioactivity steadily increases towards the detector over a 45 minute time period, or over a nine-hour time period, depending on whether the minute hand or the hour hand is used. If the hour hand is used, the alpha activity would be introduced to the detector at the 3 o'clock position, and because of the open shape of the aperture, the alpha activity will increase by 11% every hour, assuming that ⅑ of the radius length of the hour hand is revealed every hour.

Figure 7:
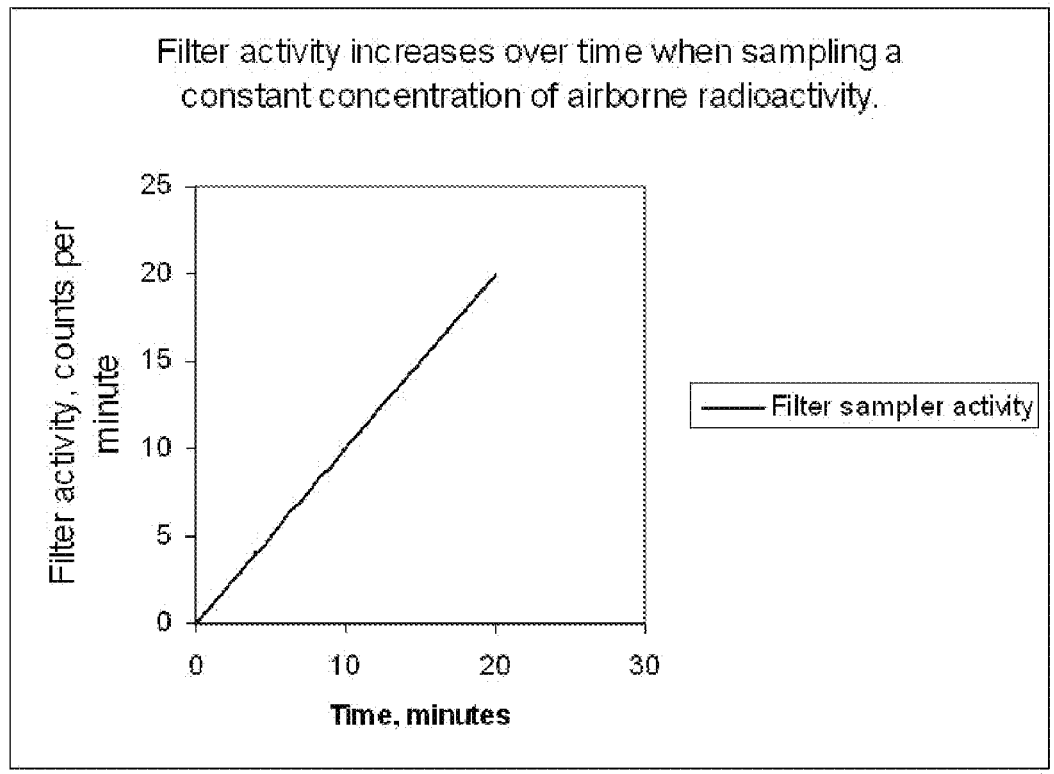
FIG. 7 is a graph showing ideal measurement in a CAM instrument of a chronic release of airborne radioactivity, where there is a constant concentration of airborne contamination in the sampled volume of air).
Figure 8:
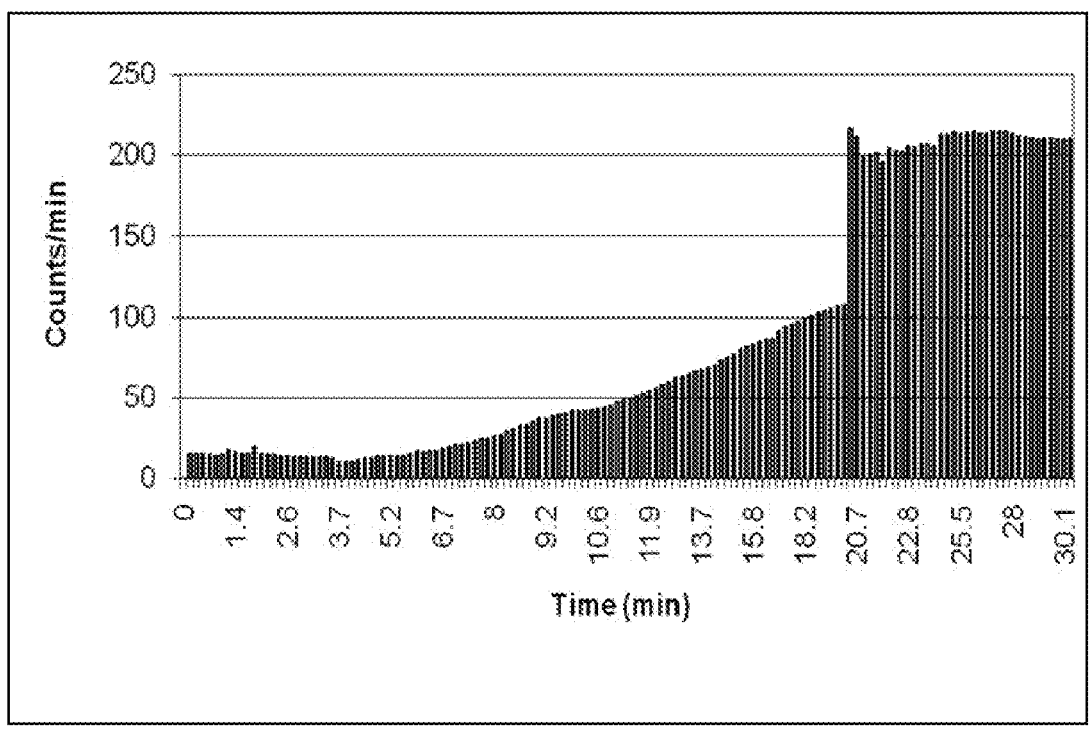
FIG. 8 is a graph showing the actual CAM instrument response to an operating DRPS prototype that is mimicking the constant concentration, chronic release test condition of radioactive aerosol.
Figure 9:
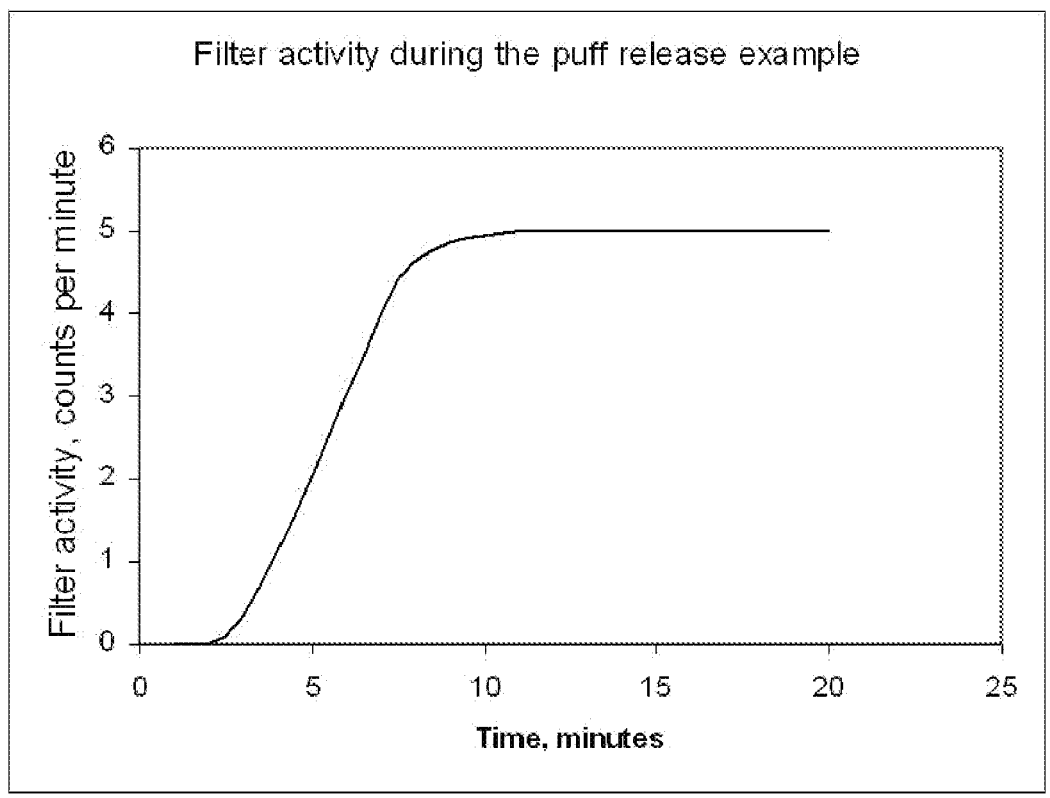
FIG. 9 is a graph showing ideal CAM instrument measurement of a puff release of airborne radioactivity into a sampled volume of air.
Figure 10:
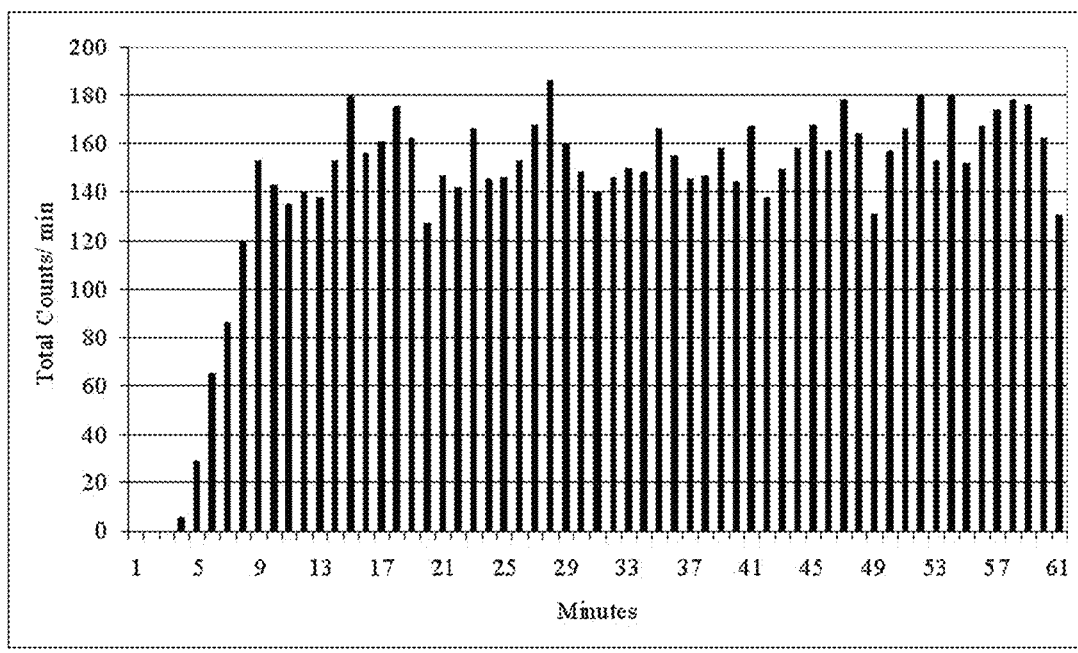
FIG. 10 is a graph showing the actual CAM instrument response to an operating DRPS prototype that is mimicking the puff release test condition of radioactive aerosol.

FIGS. 7-10 show ideal and actual data from different test scenarios. FIG. 7 is a graph showing ideal CAM instrument measurement of a chronic release (constant concentration of airborne radioactivity in a sampled volume of air). FIG. 8 is a graph showing actual CAM instrument response to an operational prototype DRPS that mimics the conditions of a (constant concentration) chronic release. FIG. 9 is a graph showing ideal CAM instrument measurement of a puff release of airborne radioactivity into a sampled volume of air. FIG. 10 is a graph showing actual CAM instrument response to an operational prototype DRPS simulation that mimics the conditions of a puff release of airborne radioactivity.

Any of the mentioned prototypes may be controlled through the use of an electrical switch in order to start and stop the motion of the rotary motor 4. This would be necessary to hold the rotating mask 5 in a fixed position for a period of time longer than the interval established by a constantly rotating system (e.g. if a wristwatch motor system were used). A test protocol might require that the system pull conventional room air into the CAM sampler for a period, in order to accumulate naturally occurring radon progeny on the air filter 1 before the DRPS system would challenge the CAM system with a test signal of radioactive particles. This would be necessary to test a CAM that is designed for detection of airborne alpha-emitting contamination, where the presence of (alpha radiation emitting) radon progeny is an interfering background signal. Another example for a pause period would be an evaluation of CAM software stability after operation in a "clean" air environment before the DRPS test challenge.

The foregoing description of the embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for testing a continuous air monitor (CAM) comprising:
   a rotary motor;
   a radioactive alpha or beta source;
   a mask for the radioactive source having an aperture;
   a mask for the rotary motor;
   wherein a radioactive alpha or beta emitting isotope is introduced into the CAM when the aperture is not covered by the mask for the rotary motor.

2. The apparatus of claim 1, wherein the rotary motor is an analog watch mechanism.

3. The apparatus of claim 1, wherein the alpha source introduces the presence of an alpha or beta-emitting isotope.

4. The apparatus of claim 3, wherein the shape of the apertures determines the rate of introduction of the radioactive particles.

5. The apparatus of claim 4 wherein the aperture is one of the following shapes: a teardrop, a circle, or an oval.

6. The apparatus of claim 3, wherein the radioactive source introduces a steadily increasing amount of radioactive particles to the CAM detector.

7. The apparatus of claim 3, wherein the radioactive source introduces a puff of an alpha or beta-emitting isotope.

8. The apparatus of claim 3, wherein a sheet of mylar is positioned above the mask for the rotary motor.

9. The apparatus of claim 3, wherein a sheet of mylar is positioned below the mask for the rotary motor.

10. The apparatus of claim 2, wherein the watch mechanism has a minute hand and an hour hand and one of the hands is electroplate-coated with an alpha or beta-radiation emitting isotope.

11. The apparatus of claim 2, wherein the apparatus is placed inside of a CAM.

12. The apparatus of claim 11, further comprising a support frame.

13. The apparatus of claim 11, wherein the support frame is placed between the rotary motor and an air filter which is inside the CAM.

* * * * *